United States Patent [19]
Aoyama et al.

[11] Patent Number: 5,855,512
[45] Date of Patent: Jan. 5, 1999

[54] METHOD FOR PROGRAMMING TELEVISION-GAME

[75] Inventors: Koji Aoyama; Koji Arai; Noriko Tsuruoka, all of Hokkaido, Japan

[73] Assignee: Hudson Soft Co., Ltd., Hokkaido, Japan

[21] Appl. No.: 768,106

[22] Filed: Dec. 16, 1996

[30] Foreign Application Priority Data

Dec. 25, 1995 [JP] Japan ................................... 7-350900

[51] Int. Cl.⁶ ........................................................ G06F 3/00
[52] U.S. Cl. ............................................................... 463/1
[58] Field of Search ................................. 463/1, 17, 18, 463/19, 29, 40, 41, 42; 380/7; 348/1

[56] References Cited

U.S. PATENT DOCUMENTS 5,231,661 7/1993 Harnum et al. ............................. 380/1
5,274,758 12/1993 Beitel et al. .
5,393,073 2/1995 Best .
5,465,384 11/1995 Bejan et al. .
5,518,253 5/1996 Pocock ..................................... 463/19

FOREIGN PATENT DOCUMENTS

06165880 6/1994 European Pat. Off. .

*Primary Examiner*—George Manuel
*Attorney, Agent, or Firm*—McDermott, Will & Emery

[57] ABSTRACT

According to a method of programming a TV-game of the present invention, the event variation process 40 is added between processes of the TV-game program. Therefore, one of the processes of the TV-game program or the event variation process 40 is selected according to a situation of a TV-game scenario. Namely, the event variation process 40 is executed only when the event variation process 40 is selected. The event variation process 40 is not executed when anther process is selected. Therefore, the CPU load is light, because the event variation process 40 is not executed at each time. Further, even if the characters of the TV-game are many, the character motion is not paused. Therefore, the TV-game can include a variety of situations, because the steps in the TV-program are not cut off.

8 Claims, 8 Drawing Sheets

NOTE:  IS PROCESS FLOW

| PREDETERMINED TIME "T" | LETTER TO BE RECEIVED |
|---|---|
| 1 HOUR | LETTER A |
| 3 HOURS | LETTER B |
| 8 HOURS | LETTER C |
| 24 HOURS | LETTER D |

NOTE: "T" IS DIFFERENCE BETWEEN TIMES OF RECEIVING PREVIOUS LETTER AND NEXT LETTER

METHOD FOR PROGRAMMING TELEVISION-GAME

FIELD OF THE INVENTION

The invention relates to a television(TV)-game, and more particularly to, a method for programming a TV-game.

BACKGROUND OF THE INVENTION

A game unit comprises a CPU, one or more memories, output/input (I/O) interfaces and an image processing unit.

The image processing unit comprises a VRAM (Video Random Access Memory), a VDC (Video Displaying Controller) and a VDE (Video Displaying color Encoder). The game unit is connected with a home TV by using the I/O interface. The VDE has a color pallet table which relates to a color code for outputting an image data and a color code for a game program.

In the game unit, the image data is processed and then outputted to the home TV through the I/O interface. The processed image data is displayed on the home TV by using scanning lines. It takes 1/60 second to display one image by the scanning lines (namely, an image displaying cycle is 1/60 second). Therefore, a neat image must be prepared within 1/60 second.

In a conventional method for programming a TV-game, when the next image is not prepared in the VRAM within a predetermined time such as the image displaying cycle, a programmer modifies a TV-game program. Further, if a next image processed by the modified TV-game program us not prepared in the VRAM within the predetermined time, a programmer must cut off one or more steps of the TV-game program.

In the conventional method for programming a TV-game, however, there are disadvantages in that a TV-game becomes very simple and rough, because the steps of the TV-game program are cut off.

SUMMARY OF THE INVENTION

Accordingly, it is an object of the invention to provide a method for programming a TV-game without changing contents of a TV-game and without increasing a CPU performance load.

According to the first feature of the invention, a method for programming a TV-game, comprises the steps of determining a process condition according to a TV-game scenario, determining an event variation process according to the TV-game scenario, and executing the event variation process when the determined process condition is sufficient. According to the second feature of the invention, a method for programming a TV-game, comprises the steps of determining one of processes in a TV-game program according to a TV-game scenario, determining an event variation process according to the TV-game scenario, and executing the event variation process after the determined process of the processes in the TV-game program is executed.

According to the third feature of the invention, a method for programming a TV-game, comprises the steps of determining a process condition according to a TV-game scenario, determining one of processes in a TV-game program according to the TV-game scenario, determining an event variation process according to the TV-game scenario, and executing the event variation process after the determined process of the processes in the TV-game program is executed and the determined process condition is sufficient.

BRIEF DESCRIPTION OF THE DRAWINGS

The invention will be described in more detail in conjunction with the accompanying drawings, wherein.

DETAILED DESCRIPTION OF THE PREFERRED EMBODIMENTS

Before explaining a method for programming a TV-game in the preferred embodiment according to the invention, the above mentioned conventional method for programming a TV-game will be explained in FIGS. 1 to 6.

Figure 1:
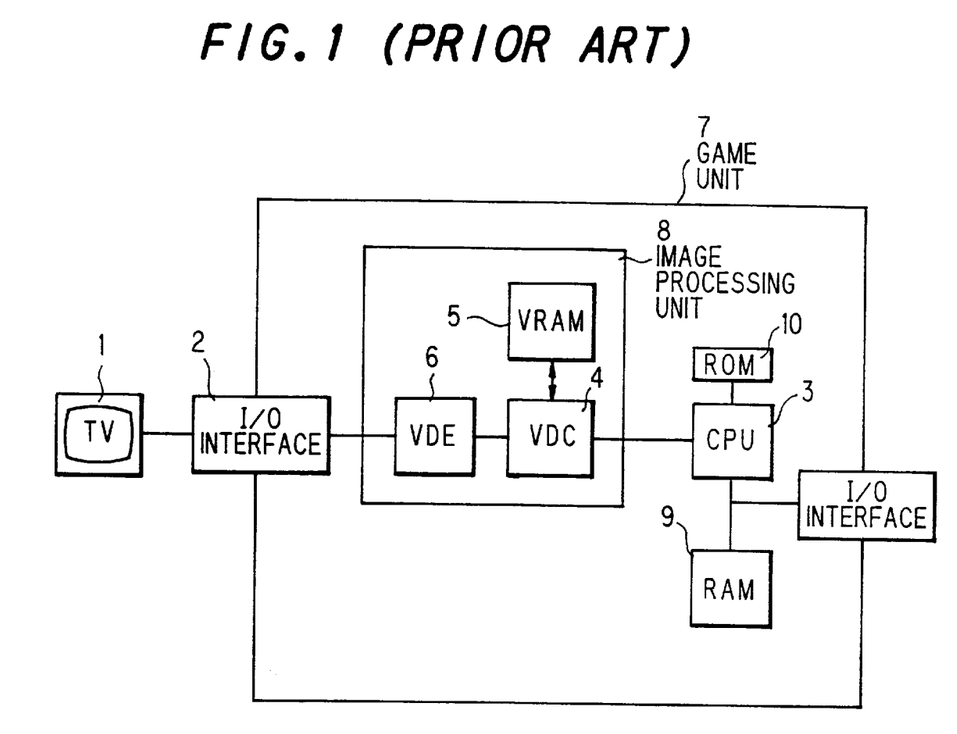
FIG. 1 is a block diagram of a TV-game unit of the prior art.

FIG. 1 is a block diagram of a TV-game unit of the prior art. A game unit 7 comprises a CPU 3, a ROM (Read Only Memory) 10 for storing an operating program such as a load program, a RAM (Random Access Memory) 9, output/input (I/O) interfaces 2 and 11, and an image processing unit 8.

The image processing unit 8 comprises a VRAM (Video Random Access Memory) 5, a VDC (Video Displaying Controller) 4, and a VDE (Video Displaying color Encoder) 5. The game unit 7 is connected with a home TV 1 by using the I/O interface 2. The VDE 6 has a color pallet table which relates to a color code for outputting an image data and a color code for a game program.

In the game unit 7, an image data and a game program is loaded into the RAM 9 through the I/O interface 11 by the CPU 3 using a load program in the ROM 10. The image data in the RAM 9 is processed by the CPU 3. The VDC 4 has a display pattern, a color code and a display position of an image data. The processed image data is stored in the VRAM 5 through the VDC 4. Then the image data in the VRAM 5 is converted into an output image data by, the VDC 4. The output image data is sent to the VDE 6. The VDE 6 converts the output image data into an analog image data for a home TV 1. The analog image data is outputted to the home TV 1 through the I/O interface 2.

Figure 2:
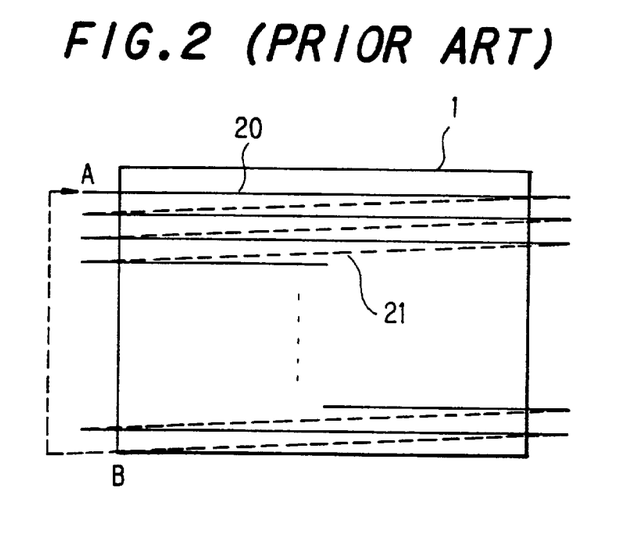
FIG. 2 is a block diagram of a home TV display unit.

FIG. 2 is a block diagram of a home TV display unit. The analog image data is displayed on the home TV 1 by using scanning lines 20 and 21. The scanning lines 20 and 21 display an image on the home TV 1 according to scanning from right to left and from up to down. The scanning lines 20 shown by a full line, which run from right to left, are displayed on the home TV 1. The scanning lines 21 shown by a broken line, which return from left to right, are not displayed on the home TV 1. One image displaying cycle is a scanning process from a point A to a point B and a return process from the point B to the point A (A→B→A). It takes 1/60 second to display one image by the scanning lines 20 (namely, one image displaying cycle is 1/60 second). Therefore, a next image must be prepared within 1/60 second.

For example, when an animation image is displayed, an animation image data in the VRAM 5 must be replaced with a next animation image data within ⅟60 second.

Figure 3:
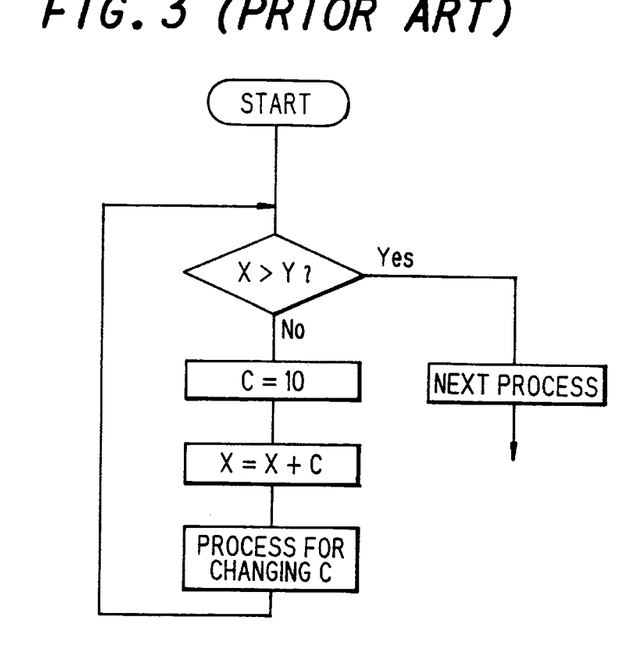
FIG. 3 is a sample flow chart of a TV-game program of the prior art.
Figure 4:
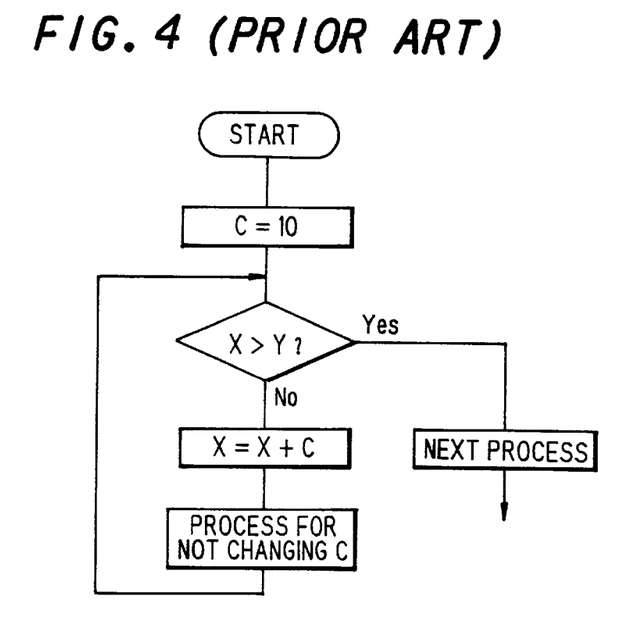
FIG. 4 is a sample flow chart of a TV-game program of the prior art.

FIG. 3 and 4 are sample flow charts of a TV-game program of the prior art. In FIG. 3, a statement "C=10" is placed in a program loop, because a programmer considers that a program logic does not include a logic absurdity. In this case, a program efficiency is bad, because the statement "C=10" is wastefully executed many times in every loop. In FIG. 4, the statement "C=10" is placed out the program loop, because a programmer considers a program efficiency rather than a program logic.

Both program patterns in FIGS. 3 and 4 have an advantage and a disadvantage. Therefore, the programmer selects a program pattern in FIG. 3 or 4 on case-by-case.

In a conventional method for programming a TV-game, when the next image is not prepared in the VRAM 5 within a predetermined time such as the image displaying cycle, a programmer modifies a TV-game program. Namely, the programmer searches for the program pattern such as FIG. 3, then the program pattern is modified such as FIG. 4. Further, if a next image processed by the modified TV-game program is not prepared in the VRAM 5 within the predetermined time, the programmer must cut off one or more steps of the TV-game program.

Figure 5:
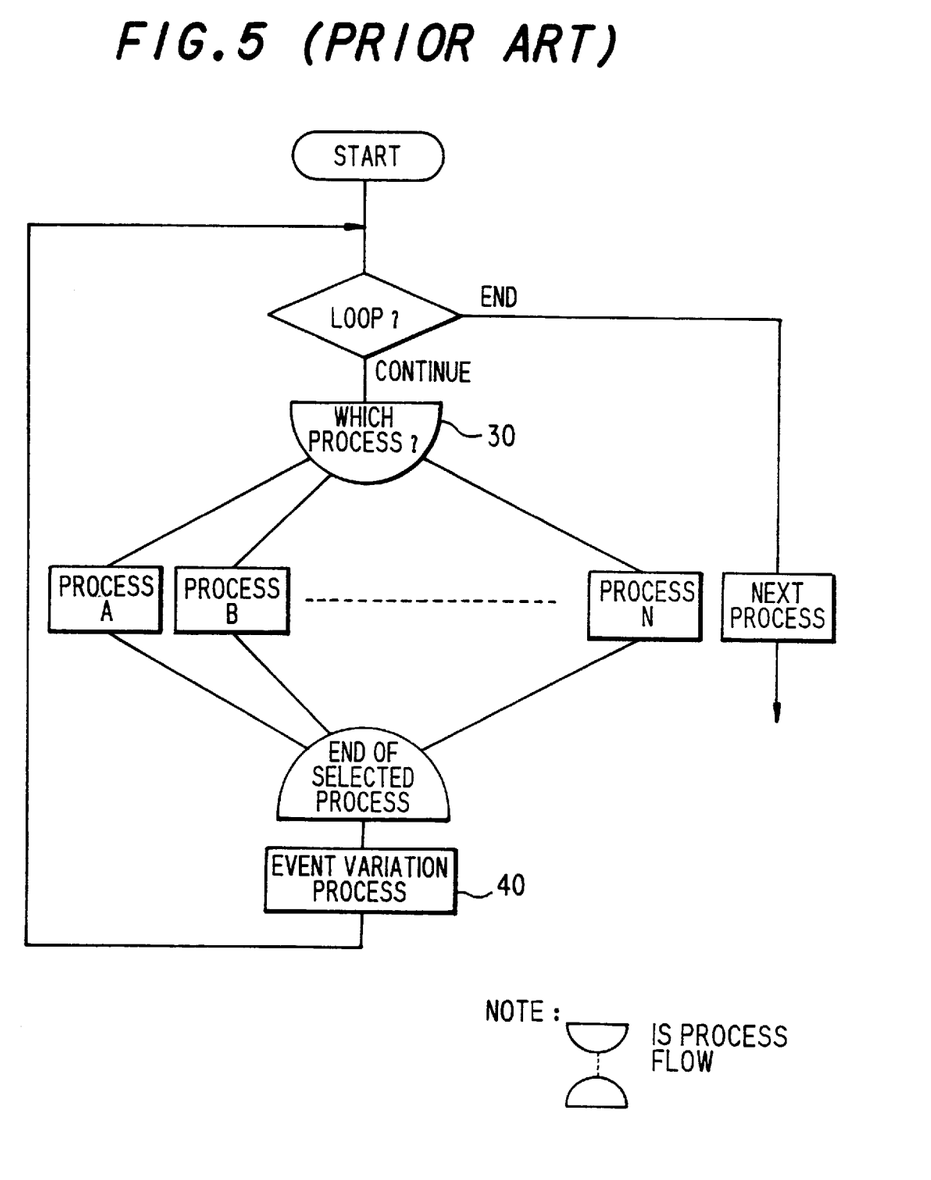
FIG. 5 is a flow chart of an event variation process of the prior art.

FIG. 5 is a flow chart of an event variation process of the prior art. This loop is executed at an integer times period of the image displaying cycle. The period is within ⅟10 second, because if the period is over ⅟10 second a character motion of the TV-game is not smooth. In FIG. 5, at the step 30, any one of processes A to N is selected according to a situation of the TV-game scenario. After the selected process is executed, an event variation process is executed at the step 40. The CPU load is very heavy, because the event variation process 40 is executed at each time. The event variation process time is much longer than the image displaying cycle. In particular, when the characters of the TV-game are many, the character motion is paused. Therefore, the programmer must cut off one or more steps in the processes A to N.

Figure 6:
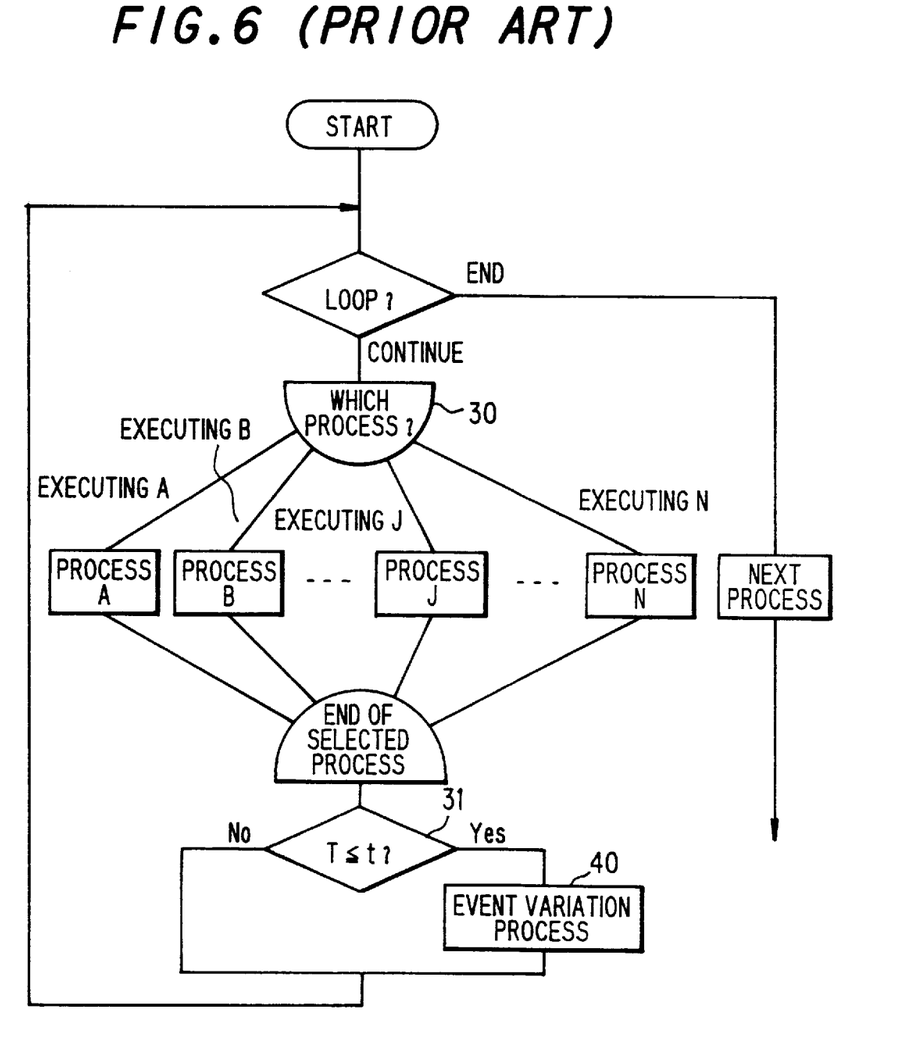
FIG. 6 is a flow chart of a conditional event variation process of the prior art.

FIG. 6 is a flow chart of a conditional event variation process of the prior art. This loop is executed at an integer times period of the image displaying cycle. In FIG. 6, at the step 30, any one of processes A to N is selected according to a situation of the TV-game scenario. After the selected process is executed, a condition process is executed at the step 31. At the step 31, "T" indicates a predetermined conditional time in the TV-game and "t" indicates a situation time (an elapsed time) according to a TV-game scenario. If "t" is same as or greater than "T" (T≦t), after the condition process 31, an event variation process 40 are executed. In this case, the CPU load is very heavy, because a condition process 31 and the event variation process 40 are executed at each time until the situation time ("t") is cleared. In particular, when the characters of the TV-game are many the character motion is paused, because the event variation process time is much longer than the image displaying cycle. Therefore, the programmer must cut off one or more steps in the processes A to N.

In the conventional method for programming a TV-game, however, there are disadvantages in that a TV-game becomes very simple and rough, because one or more steps of the TV-game program are cut off.

Therefore, a method for programming a TV-game without cutting off the steps of the TV-game program is necessary to be provided.

Next, a method for programming a TV-game in the first preferred embodiment according to the invention will be explained in FIGS. 7 to 10.

Figure 7:
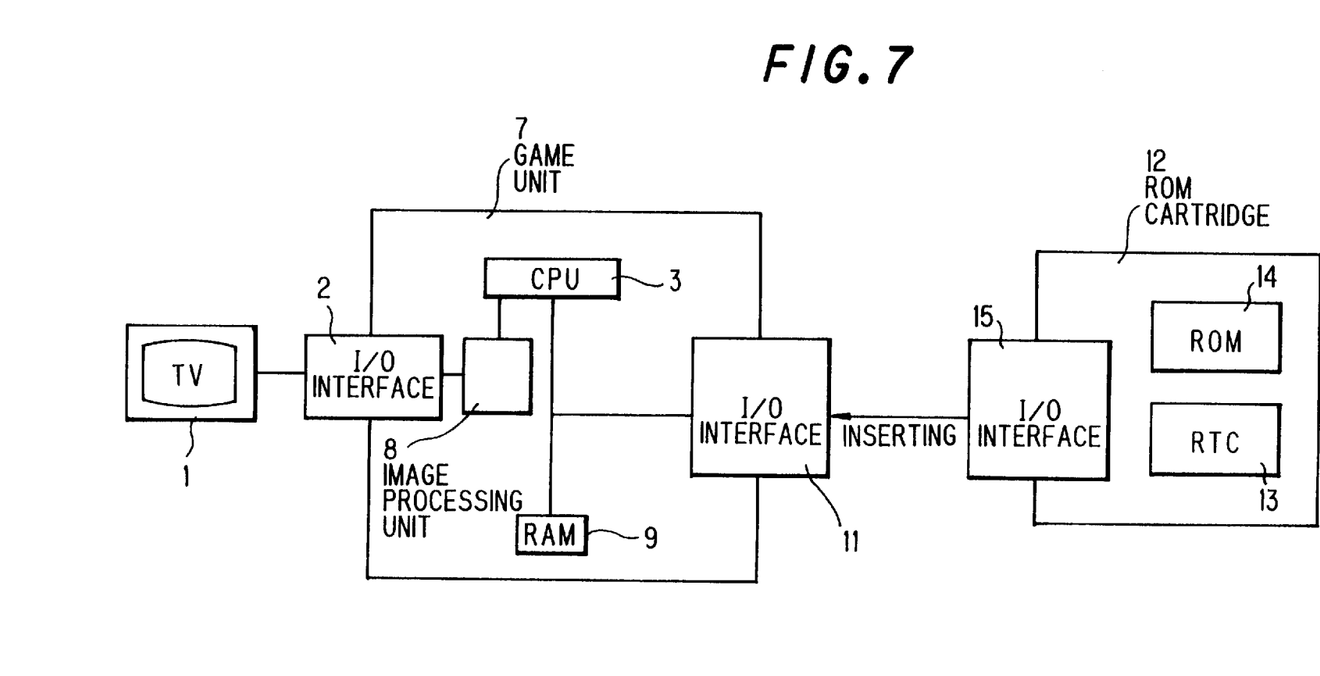
FIG. 7 is a block diagram of a game unit and a ROM cartridge of the present invention.

FIG. 7 is a block diagram of a game unit and a ROM cartridge of the present invention. In FIG. 7, the TV-game apparatus comprises a game unit 7 and a ROM cartridge 12. The game unit 7 has a CPU 3, a ROM (Read Only Memory) 10 for storing an operating program such as a load program, a RAM (Random Access Memory) 9, output/input (I/O) interfaces 2 and 11, and an image processing unit B. The ROM cartridge 12 has a ROM 14 and a RTC (Real Time clock) 13.

In the game unit 7, the CPU 3, the ROM 10, and the RAM 9 are connected with each other. The CPU 3 is for executing programs and instructions. The ROM 10 is for storing programs and instructions of an operating system of the TV-game apparatus. The RAM 9 stores a part or all of the game program. The game unit 7 of the present invention is same as the prior art in FIG. 1.

The RTC 13 in the ROM cartridge 12 is an IC (Integrated Circuit) having a clock function and a calendar function. A time of a TV-game is corresponded with a real time by the clock function and the calendar function in the RTC 13. Namely, the RTC 13 saves year, month, day, day of the week, hour, minute, and second of the real time therein at the time of the TV-game by using the clock function and the calendar function.

Further, the I/O interface 11 is in connection with the I/O interface 15 according to inserting the ROM cartridge 12 into the game unit 7. The TV-game program is stored in the ROM 14. The CPU 3 accesses the ROM 14 and the RTC 13. Then, the CPU 3 loads the TV-game program from the ROM 14 and a content in the RTC 13. The TV-game program and the content in the RTC 13 are supplied to the RAM 9 in the game unit 7 through the connected I/O interfaces 11 and 15. Then, the CPU 3 processes the TV-game program according to the content from the RTC 13.

Figure 8:
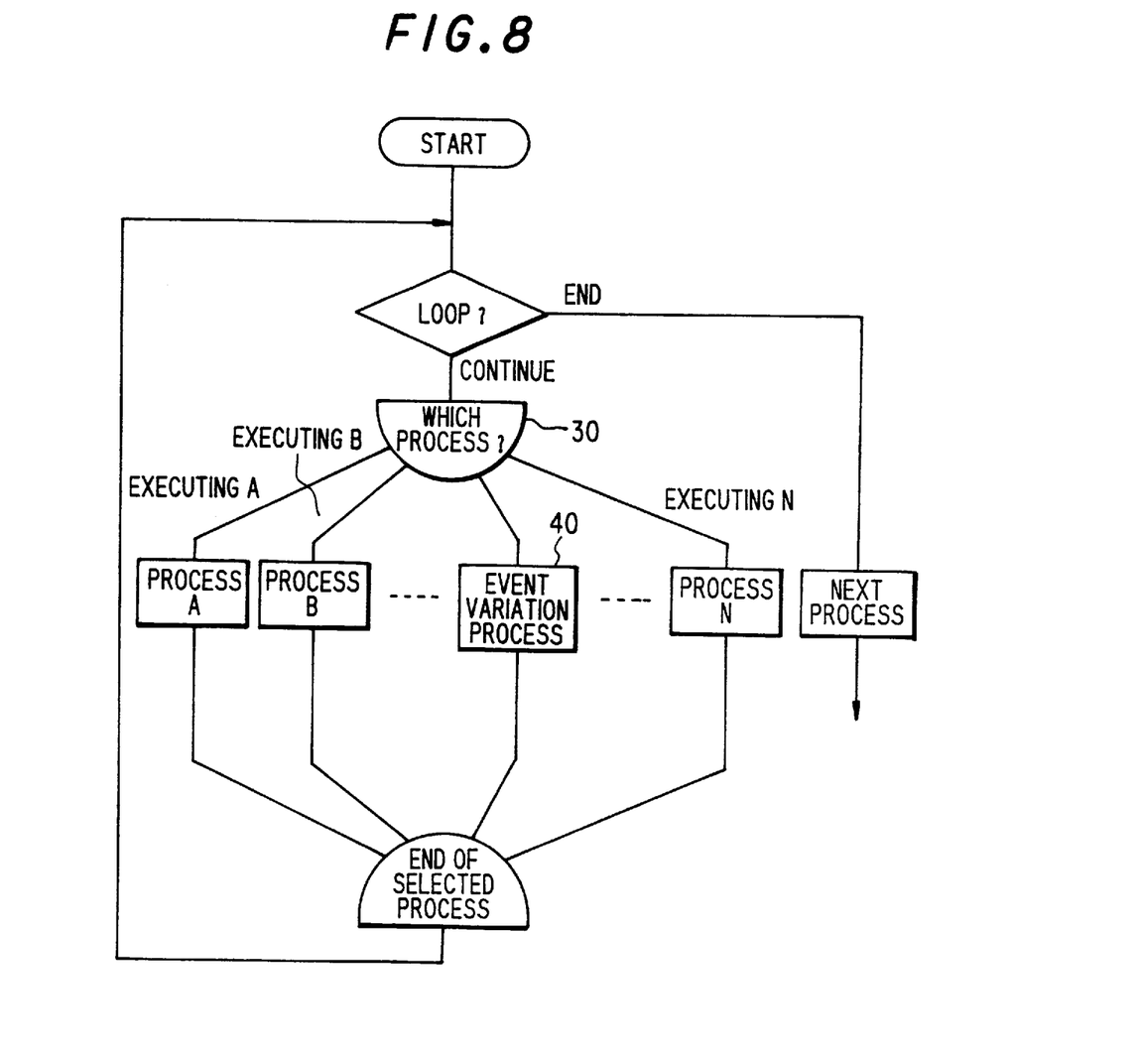
FIG. 8 is a flow chart of an event variation process of the present invention.

FIG. 8 is a flow chart of an event variation process of the present invention. This loop is executed at an integer times period of the image displaying cycle. The period is within ⅟10 second, because if the period is over ⅟10 second a character motion of the TV-game is not smooth. In FIG. 8, the event variation process 40 is added between the processes A to N. Therefore, at the step 30, any one of the processes A to N or the event variation process 40 is selected according to a situation of the TV-game scenario. Namely, the event variation process 40 is executed only when the event variation process 40 is selected at the step 30. The event variation process 40 is not executed when anther process is selected at the step 30. Therefore, the CPU load is light, because the event variation process 40 is not executed at each time. Further, even if the characters of the TV-game are many, the character motion is not paused. Therefore, the TV-game can include a variety of situations, because the steps in the TV-program are not cut off.

Figure 9:
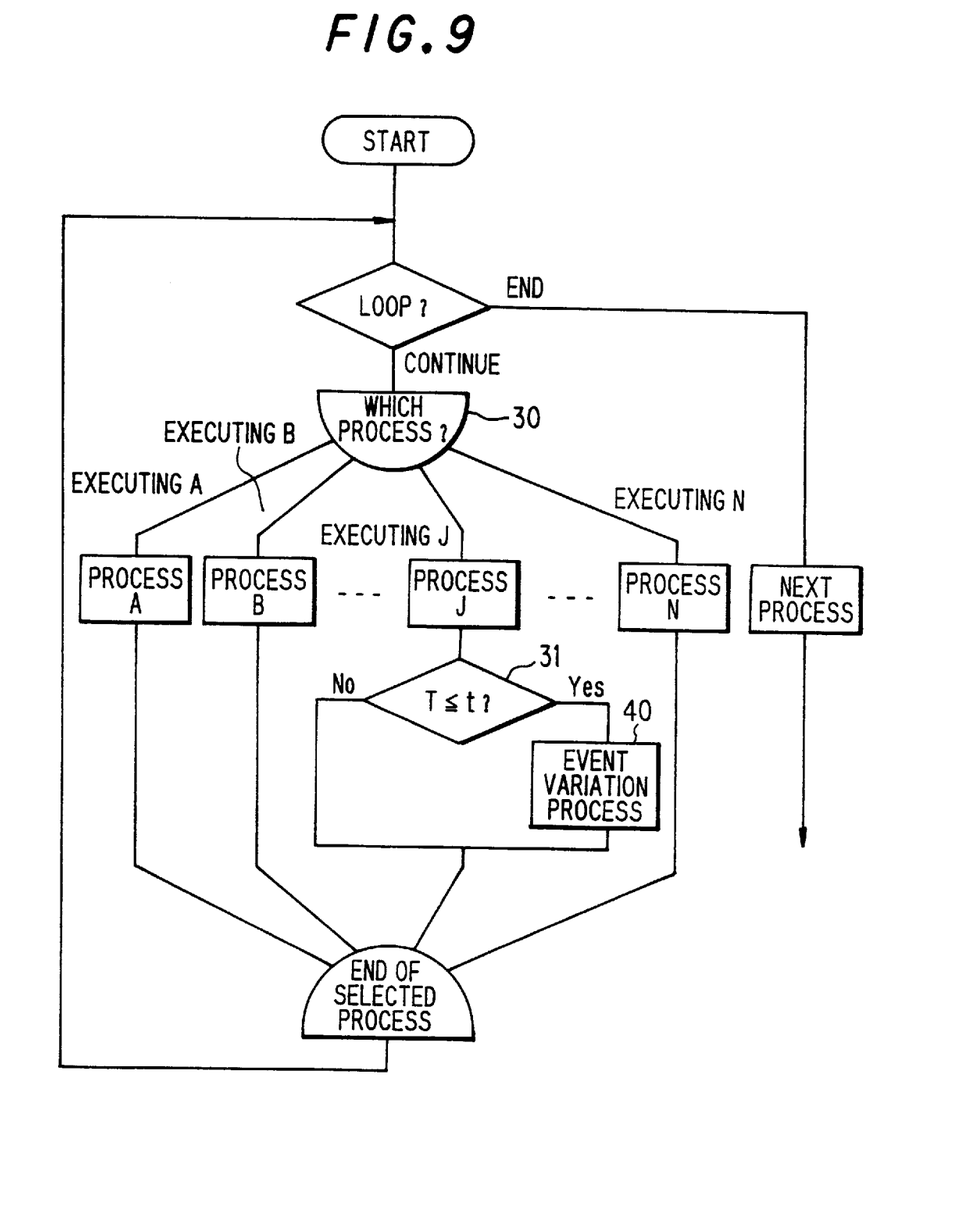
FIG. 9 is a flow chart of a conditional event variation process of the present invention.

FIG. 9 is a flow chart of a conditional event variation process of the present invention. This loop is executed at an integer times period of the image displaying cycle. In FIG. 9, the condition process 31 and the event variation process 40 is added after the process J. At the step 30, any one of processes A to N is selected according to a situation of the TV-game scenario. Namely, the condition process 31 is executed only when the process J is selected at the step 30. The condition process 31 is not executed when anther process is selected at the step 30. After the process J is executed, the condition process 31 is executed. At the step 31, "T" indicates a predetermined conditional time in the TV-game and "t" indicates a situation time (an elapsed time) loaded from the RTC 13 in the ROM cartridge 12 according to a TV-game scenario. If "t" is same as or greater than "T" (T≦t) at the step 31, the event variation process 40 are executed. Namely, the event variation process 40 is executed only when both the process J is selected at the step 30 and "t" is same as or greater than "T" (T≦t) at the step 31. The event variation process 40 is not executed when the selected process at the step 30 is not the process J or "t" is smaller than "T" (t≦T) at the step 31. Therefore, the CPU load is light, because the event variation process 40 is not executed at each time. Further, even if the characters of the TV-game are many, the character motion is not paused. Therefore, the TV-game can include a variety of situations, because the steps in the TV-program are not cut off, In this case, the event variation process 40 does not executed just on time according to the TV-game situation, because the process J must be selected before the event variation process 40 is executed. However, this method is better than the conventional method, because the TV-game content is not changed generally.

For example, the flow chart in FIG. 8 is explained on assumption that a TV-game scenario is a keeping pet. The TV-game has conditions as follows:

(1) a pet has a life span points;

(2) one point is decreased in the life span points every one hour elapsing in the RTC 13;

(3) the pet dies when the life span point is zero;

(4) the life span points are recovered by the pet eating food;

(5) the pet is kept only in a pet shop; and (6) a life span process is executed only when the pet is in the pet shop or the pet is spoken to.

In this case, the process 30 in FIG. 9 selects the event variation process 40 when the pet is in the pet shop or the pet is spoken to (the above condition (6)). The event variation process 40 in FIG. 9 are the life span process of the above condition (6).

The condition (6) is processed as follows:

(1) "a time of a previous life span process =t1";

(2) "a current time of the RTC 13=t2";

(3) "T=t2−t1 (hours)";

(4) "the life span points = the life span points −T";

(5) "t1=t2" (t1 modified); and (6) the life span process is executed according to the modified life span points, in particular, the pet dies when the life span point is zero (the above condition (3)).

Figure 10:
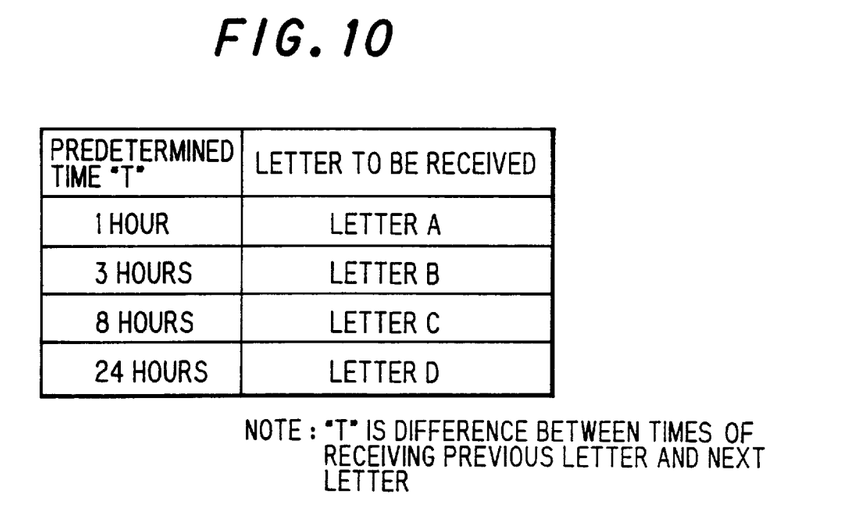
FIG. 10 is a timing chart of a preferred embodiment in FIG. 9.

Next, the flow chart in FIG. 9 is explained on assumption that a TV-game scenario is such as receiving a letter at the predetermined time (T). FIG. 10 is a timing chart of a preferred embodiment in FIG. 9. The TV-game has conditions shown in FIG. 10. In this case, "T" is a difference between a time of receiving a previous letter and a next letter. The process J in FIG. 9 is on assumption that an image process replaces a background image called as "MAP" of the TV-game. Namely, after the "MAP" of the TV-game is replaced, an elapsed time (t) in-the RTC 13 is compared with "T" (at the step 31 in FIG. 9). If "t" is same as or greater than "T", any one of letters A to D is received corresponding with the TV-game scenario and the predetermined time "T".

In these above cases, the event variation process 40 does not executed just on time according to the TV-game situation. However, a method of the present invention is better than the conventional method, because the TV-game content (scenario) is not changed generally.

In another preferred embodiment according to the invention, in FIG. 7, the RTC 13 may be existed in the game Unit 7. Further, the VRAM 5 and the RAM 9 may be replaced with a non-volatile matter such as an EEPROM (Electrically Erasable Programmable Read Only Memory) or a flash memory.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. A method of programming a TV-game, the method comprising the steps of:

determining a process condition according to a TV-game scenario;

determining one of a plurality of processes in a TV-game program according to the TV-game scenario;

determining an event variation process in said TV-game program according to said TV-game scenario; and executing said event variation process after said determined process of said plurality of processes in said TV-game program is executed and said determined process condition is sufficient.

2. The method of claim 1, wherein said event variation process is carried out in response to said step of determining one of a plurality of processes, when no other processes are selected during said step of determining one of a plurality of processes.

3. The method of claim 2, wherein said step of determining one of a plurality of processes performs a selection between said event variation process and said other processes in accordance with the TV-game scenario.

4. The method of claim 1, wherein a condition process is carried out in response to a predetermined process selected during said step of determining one of a plurality of processes.

5. The method of claim 4, wherein said condition process is carried out to define a predetermined game event.

6. The method of claim 5, wherein said event variation process is carried out only in response to said predetermined game event.

7. The method of claim 4, wherein said condition process is carried out to compare an event time with a predetermined time period.

8. The method of claim 7, wherein said event variation process is carried out when said event time is not less then said predetermined time period.

* * * * *